United States Patent [19]

Reily

[11] 4,350,736
[45] Sep. 21, 1982

[54] WEAR AND WATER RESISTANT PLASTER ARTICLES

[75] Inventor: William S. Reily, Des Plaines, Ill.

[73] Assignee: United States Gypsum Company, Chicago, Ill.

[21] Appl. No.: 168,971

[22] Filed: Jul. 14, 1980

[51] Int. Cl.³ ............................ B32B 9/06; B32B 3/22
[52] U.S. Cl. .................................... 428/341; 428/411; 428/484; 428/486; 428/703
[58] Field of Search ............................ 156/41, 44, 45; 428/219, 486, 484, 411

[56] References Cited

U.S. PATENT DOCUMENTS

| | | | |
|---|---|---|---|
| 2,198,776 | 4/1940 | King et al. | 428/486 |
| 2,319,957 | 5/1943 | Speicher | 428/486 |
| 2,560,521 | 7/1951 | Camp | 156/41 |
| 3,383,271 | 5/1968 | Roberts et al. | 428/70 |
| 3,839,141 | 10/1974 | McKinnon | 428/486 |
| 3,962,509 | 6/1976 | Thompson | 428/182 |

*Primary Examiner*—P. E. Willis, Jr.
*Attorney, Agent, or Firm*—Glenn W. Ohlson; Robert M. Didrick; Robert H. Robinson

[57] ABSTRACT

A method of surface treatment for plaster articles to improve wear and water resistance is disclosed. The method includes the step of forming the article, allowing the article to set, drying to remove excess water, applying a coat of substantially molten Candelilla wax onto an exterior surface of said article, maintaining said wax at a temperature of no less than 155° F. (68° C.) for sufficient period of time to allow said wax to substantially fill exterior pores and irregularities, and cooling said article to solidify the wax. Also disclosed is a wear resistant and water repellent plaster article comprising a formed plaster article having an exterior surface portion thereof coated with a thin layer of Candelilla wax, said coated surface portion providing a substantially water impregnable barrier and providing enhanced wear resistance.

6 Claims, No Drawings

WEAR AND WATER RESISTANT PLASTER ARTICLES

BACKGROUND OF THE INVENTION

(1) Field of the Invention

The invention relates to a method of surface treatment for plaster articles to improve wear and water resistance and article of manufacture.

(2) Description of the Prior Art

Gypsum products, particularly gypsum board, and plaster articles of manufacture, in which the binder is typically gypsum (various forms of calcium sulphate), are widely used in commercial, industrial and residential applications. While gypsum wall board provides outstanding fire resistance and relatively low-cost, it has the disability of not being water resistant. Plaster articles, such as industrial casts, have the distinct ability to be molded into an infinite variety of shapes. However, such cast plaster articles do not offer significant wear resistance, and are additionally susceptible to moisture.

As disclosed in the prior art, when gypsum wall board is immersed in water at room temperature the lack of water resistance is readily demonstrated by the fact that in a short time the gypsum core has absorbed a considerable amount of water. Reports from numerous tests demonstrate that when a two inch cube of gypsum board core material is immersed in water at about 70° F. (21° C.), the material shows a water absorption of greater than 60% during immersion for five minutes. The prior art discloses numerous attempts to enhance water resistance and concomitantly wear resistance. Predominant among such previous attempts are those involved with the application of a water resistant material to a gypsum or plaster slurry prior to setting.

The prior art discloses that the introduction of a water resistant material into the slurry includes such compositions as metallic soaps, asphalts, waxes, and resins. A well known method is the incorporation of paraffin wax and asphalt, or other fusible water-insoluble organic substances, into a gypsum mix. First this waxy material is melted and then dispersed into the wet gypsum mix by spraying the hot molten mass into the aqueous gypsum dispersion. While obtaining water resistance, such related processes require a rather costly and large amount of materials without actually obtaining a drastic amount of water resistance or wear resistance. It would be desirable to use a comparatively small amount of water proofing and wear resistant material to obtain desired results.

Other well know techniques involve utilizing a mixture of paraffin wax and asphalt, in definite proportions, on the order of from about 5% to about 15% (dry weight), incorporated in the form of an emulsion with a wet plastic gypsum mass. The finished dry gypsum wall board will possess a degree of water resistance which is greatly out of proportion to the degree of water resistance obtained if one uses the same paraffin wax and asphalt materials without emulsification. Related teachings disclose the addition of a composition of asphalt, paraffin wax and potassium sulfate. While significant water resistance is obtained, it is necessary to include the added materials to the entire gypsum slurry. A certain amount of unnecessary addition is thus required, such as at the interior of the core, where water resistance is not as critical as at the exterior faces of the board, or molded article.

Another method, in line with the last mentioned procedures, utilizes a composition of asphalt, paraffin wax and a substance selected from the group consisting of alkali and alkaline earth aluminates and Portland cement. Similarly asphalt and paraffin wax compositions are utilized wherein a blend of oil-soluble alkali salt of mahogany sulfonic acid is provided.

In taking a different approach, others have utilized polyvinyl alcohol for both sag resistance and the sizing of paper coatings. In this regard some have used polyvinyl alcohol and an asphalt-wax emulsion but require that a significantly large percentage of the weight be polyvinyl alcohol. Since the cost of polyvinyl alcohol may be prohibitive, the end result—water resistance—may be extremely costly. Additionally, utilization of asphalt-wax emulsions for treating the gypsum core do not provide significant wear resistance.

Further water resistant additives, which have been effective to various degrees, include the following: mixtures of wax and/or asphalt, and also corn flour and potassium permanganate; water-insoluble thermoplastic organic materials, such as petroleum and natural asphalt; coal tar and thermoplastic synthetic resins such as polyvinyl acetate, polyvinyl chloride and a copolymer of vinyl acetate and vinyl chloride; a mixture of an alkali metal rosin soap, a water soluble alkaline earth metal salt and residual fuel oil; petroleum wax mixtures in the form of an emulsion and either residual fuel oil, pine tar or coal tar; other mixtures utilizing residual fuel oil and rosin; aromatic isocyanates and diisocyanates; and, organohydrogenpolysiloxanes. The consistency of water resistance provided by such techniques has not been established to provide uniform results. Moreover, utilizing wax-asphalt emulsions in gypsum compositions has a tendency to retard the hydration of the gypsum. With the well known use of gypsum set accelerators, additional amounts of accelerators are required to overcome the retardation by the wax-asphalt emulsion. The use of the additional amount to off-set the retarding effect of the wax-asphalt emulsion results in a decrease of water resistancy.

Additional utilizations of resins for inclusion in a gypsum or plaster slurry include hydrophobic natural, synthetic and modified varieties, for example, ester gums, maleic anhydride modified rosin, phenol formaldehyde modified rosin, copolymers of styrene, vinyltoluene butadiene copolymers, polyvinyl chloride, polyvinyl acetate, acrylic copolymers, and petroleum and coal tar hydrocarbon resins. Attempts at reducing the amount of asphalt and wax include the use of a small amount of a borate compound having an anion comprising boron and oxygen, such as borax. It has been determined that the use of a small amount of a borate compound permits a smaller amount of the relatively expensive polyvinyl alcohol to be used without a reduction in the water resistance of the final product.

Recent improvements in the utilization of paraffin emulsions set forth the preparation of this emulsion by emulsifying a paraffin hydrocarbon having a melting point of 104°–176° F. (40°–80° C.) and an oxidized paraffin having an acid value of 10–70 at a ratio of from 97:3 to 50:50 by weight, respectively, in the presence of a water-soluble alkali compound. Such procedures have been utilized to maintain the adhesiveness between a gypsum core and paper coating and maintain the conventional physical properties of the gypsum board.

While the foregoing illustrates the extensive prior practices with regard to mixing various compositions with a gypsum or plaster slurry, relatively few surface coating or post-treatments for plaster articles are disclosed. In very early attempts, surface coating techniques utilized total immersion of a plaster article in a bath prepared by melting wax, such as Carnauba wax. Such techniques are time consuming and costly. The amount of water resistancy produced was inexact and no degree of certainty could be predicted. Moreover, an inordinate amount of wax was used due to the inherent wastefulness of such total immersion techniques. It is also problematic to not significantly heat a plaster article after it has been dried since re-calcination can occur at high temperatures when exposure is prolonged.

While many prior art attempts have striven toward enhanced water resistance for gypsum board and plaster cast articles, the attainment of wear resistance, as well as water resistance, has been minimally treated. The use of a surface coating for treating plaster articles would be highly desirable for providing both wear resistance and water repellency. Such would be desirable in that the surface protection would require only a treatment at the exterior portion of a plaster article rather than the costly, and sometimes deleterious, utilization of a composition introduced throughout the slurry prior to setting.

It is accordingly a primary goal of this invention to provide a method of surface treatment for plaster articles to improve wear and water resistance.

It is additionally an important goal of this invention to provide a method of surface treatment utilizing a wax material in a relatively small amount and thus alleviating the costly need for inclusion of a composition throughout the plaster slurry.

It is an allied object of the invention to provide both wear resistance and water repellency for plaster articles in a method of treatment subsequent to the article being dried to remove excess water.

It is also a concomitant object of the invention to utilize a wax, which has a low melt point, for treating an exterior surface of a plaster article, wherein post-heating of the plaster article at elevated temperatures would not be required such that re-calcination can be avoided.

Accordingly, it is a goal of the invention to utilize a wax in a surface treatment for plaster articles having a melt point which is high enough that at elevated ambient room temperatures, the surface coating retains its hardness.

It is a related object of the invention to utilize a wax, by applying the wax in molten form onto an exterior surface of a plaster article, such that the wax can substantially fill exterior pores and irregularities to thereby provide a surface coating which is wear and water resistant.

SUMMARY OF THE INVENTION

The invention includes a method of surface treatment for plaster articles to improve wear and water resistance. The method comprises the steps of forming a plaster and water slurry, allowing said slurry to set into a dimensionally stable plaster article, drying said article to remove excess water, applying a coat of substantially molten Candelilla wax onto an exterior surface of said article, maintaining said wax at a temperature of no less than about 155° F. (68° C.) for a sufficient length of time to allow said wax to substantially fill exterior pores and irregularities of said exterior surface, and cooling said article to solidify the wax.

In additionally summarizing the invention, a wear resistant and water repellent plaster article is provided and comprises a formed plaster article having an exterior surface portion thereof coated with a thin layer of Candelilla wax, said wax solidified to a hard finish wherein said wax is present in an amount no less than about 0.020 pounds per square foot (0.010 grams per square centimeter). The wax coating said exterior surface portion and substantially filling exterior pores and irregularities. The coated surface portion providing a substantially water impregnable barrier and providing enhanced wear resistance. The coated surface portion having a light yellow to light brown color and capable of being buffed to a lustrous finish. Said wax having a sufficiently high melt point providing a firm surface upon exposure to ambient room temperatures of up to about 130° F. (54° C.).

DESCRIPTION OF THE PREFERRED EMBODIMENTS

In accordance with the invention, it has been discovered that plaster articles, such as gypsum wall board and cast plaster articles, having improved wear and water resistance, can be provided by a surface treatment after the normal drying of the set slurry, which removes excess water therefrom. The method is low cost, in that the treatment is at the surface without the requirement of mixing a composition throughout the slurry. The physical properties of the setting plaster mass are therefore not affected. Inclusion of water resistant material throughout the core is eliminated.

In attaining the goals of the invention, the inventor has discovered that certain waxes solidify to a hard lustrous finish. While certain of these waxes may provide relative equivalent hardness, the manner of application to a gypsum article is limited. Certain important properties are required in addition to mere surface firmness and water resistance. Wear resistance, as well as moisture resistance, is desirable to the industry. The wax must coat the surface, and substantially fill exterior pores and irregularities, of a plaster article. If a lustrous appearance is preferred, it must be attainable by relatively minimal polishing. The coloration of the surface coating is desirably maintained in a light hue to permit wide industrial usages. Most importantly, the melting point of the wax must be maintainable at temperatures whereby re-calcination of the plaster article is insignificant in a post-drying step. The wax, in the molten state, must easily seep in to exterior plaster surfaces for proper coating to occur. The wax must be readily available at at a relatively low cost such that any increase in manufacturing expense is kept to a minimum.

Available commercial waxes are present in four basic categories: animal, mineral, vegetable and synthetic. Examples of animal waxes are beeswax and spermaceti. Mineral waxes are those such as Montan, Ozokerite, petroleum waxes and domestic Ceresine. Typical vegetable waxes widely used in commercial applications are bayberry, Candelilla, Carnauba Esparto, Japan, Ouricury and rice bran. Well known synthetic commercial waxes are: Ross Wax 141, Fischer-Tropsch, fatty acid glycerides and fatty acids.

It has now been found, in accordance with the present invention, that a plaster or gypsum composition can be given the desirable wear resistant and water repellent properties by being coated in a method of surface treatment by the application of substantially molten Candelilla wax onto an exterior surface of said article in a relatively small amount. In the preferred manner of practicing this invention, the molten wax is applied in no less than about 0.020 pounds per square foot (0.010 grams per square centimeter).

It has also been determined that in the application of Candelilla wax, it should be maintained in a molten state for a period of time sufficient to allow the wax to substantially fill exterior pores and irregularities of said exterior surface. In maintaining this molten state, it has been determined that a temperature of about 155° F. (68° C.) is suitable. Such temperature permits the heating of a cast plaster article, or a gypsum board manufactured by a conventional board-line procedure, to be exposed to re-heating without significant re-calcination occurring.

Candelilla wax is a vegetable wax found in the form of scales entirely covering a reed-like plant (*Euphorbiea antisiphilitica*, the *Euphorbiea cerifera* and the *Pedilanthus Pavonis*) growing in abundance in Mexico and Southern Texas. Production is year-round and usually available in a crude, lump and powder form, or in a slightly more expensive refined flake. Its melt point, 155°–162° F. (68.5°–72.5° C.), offers a highly desirable range in comparison to other waxes of the same general family. Its ability to melt and interact with exterior surfaces of plaster articles gives it unexpected and significant advantages. When applied in a molten state it solidifies upon cooling and gradually reaches its maximum hardness usually in about two days. Its color is light brownish to light yellowish and imparts this light coloration to the coated plaster surface.

In treating plaster articles, specifically cast articles utilizing gypsum as a binder, such as art plasters, molding plasters, industrial plasters, dental plasters, tooling plasters and pottery plasters, a plaster and water slurry, including calcined gypsum, is placed into a mold. Typically the water is mixed with powdered anhydrous calcium sulphate or calcium sulphate hemihydrate ($CaSO_4.\frac{1}{2}H_2O$), which represents the calcined gypsum. The slurry is allowed to hydrate, or set, into relatively hard calcium dihydrate ($CaSO_4.2H_2O$). The cast article is then removed from the mold, heated to remove excess water at temperatures of from about 100°–120° F. (38°–49° C.), and then ready for its ultimate use. Such use sometimes involves its implementation as a master for replication of other similarly shaped articles, which may be formed from different materials. This is conventionally done by the use of a Keller machine wherein a stylus rides about the shape of the cast article and a cooperative second portion cuts or forms the desired article in duplication of the shape followed by the stylus on the cast article. Thus, wear resistance is particularly critical in this application. Moreover, it is also necessary that cast articles used in this manner maintain their shape despite moisture conditions. Thus water resistance additionally becomes a factor when using a cast plaster item for tooling uses.

It has been discovered that subsequent to removal of free water by heating, an application of molten Candelilla wax can satisfy the aims, objects and goals of this invention. It has also been found that a thin coat of substantially molten Candelilla wax can be applied onto an exterior surface of a cast article in an amount of no less than 0.020 pounds per square foot (0.010 grams per square centimeter) to obtain these surprising results. The melt point range for this wax is such that no degrading calcination occurs at the surface of the cast article. After application of the molten wax, it is desirable to further maintain the wax at a temperature of no less than 155° F. (68° C.) for a brief period of time to allow the wax to substantially fill exterior pores and surface irregularities. These irregularities and pores are minute and generally are not deeper than about 1/64th of an inch. Upon substantially filling these areas, the article is cooled to solidify the wax in ambient surroundings of normal room temperatures. In about one to three days the Candelilla wax hardens to its final firm finish. At this stage it is ready for use, such as with a Keller machine, or for other well known industrial applications. Similarly, applications for use in pottery, dental work, art objects, building construction shapes, are also envisioned. The same method would be utilized for surface coating. It is generally desirable to coat the entire exterior surface of the cast plaster article but specific areas may be individually coated as particular needs arise, as one would well understand.

Because the wax must be molten for a brief period of time, it is necessary that prolonged heating be avoided such that harmful re-calcination of the cast gypsum article does not occur. It has been discovered that the cast article may be placed into a heated oven means for about 60 seconds without any serious degradation occurring. This step may be carried out by pre-heating the oven means to a temperature of from about 300° F. (149° C.) to about 650° F. (343° C.). This relatively short period of time avoids re-calcination but is also hot enough to assure that any minute lumps and/or flakes of the wax are melted and seep into the pores of the coated surface.

An alternative to higher heating temperatures is to alternately place the cast article into an oven means for no greater than about 15 to 20 minutes. Temperature ranges which can be utilized for this period of time may be of from about 155° F. (68° C.) to about 220° F. (104° C.). This alternative also avoids the problem of serious re-calcination of the gypsum and allows the wax to remain molten while breaking up small particles and lumps for the attainment of an even surface coating.

Other alternatives may involve the use of a heat emitting means, which is applied at individual areas or surface portions of the exterior surface to be treated. Such heat emitting means can be infrared lamps, hot air guns, open flames, and the like. Such temperatures at these means are generally greater than 400° F. (204° C.) and as such the application at any surface portion should not be extended for greater than a few seconds. This is a relatively quick melting alternate methodology which can effectively be used.

It has also been discovered that a method for producing a wear resistant and water repellent gypsum board can be provided utilizing Candelilla wax. Typical board-line manufacturing techniques include generally the steps of depositing a plastic gypsum mass or slurry between fibrous liners, pressing the mass to a desired thickness by means of rollers, allowing the gypsum to set and harden before cutting the formed gypsum board, and finally passing the formed gypsum board through a dryer to remove excess moisture. One or both of the fibrous liners, such as paper-coating, may be eliminated to produce an uncoated wall board. The board is thus shaped having two opposite exterior faces. In typical constructions only one face is generally required to be water resistant. However, it may be desirable to provide water resistancy at both opposite exterior faces. In heating gypsum wall board to remove free water therefrom, usually a drying oven is maintained at a temperature of from about 250° to 650° F. (121° to 343° C.). The board is placed therein, depending upon its thickness and density, for a period of time of from about 20 minutes to about 90 minutes. It has been found that immediately following this drying oven step, a thin coat of substantially molten Candelilla wax may be applied onto at least one exterior face of said board in an amount no less than about 0.020 pounds per square foot (0.010 grams per square centimeter) to obtain excellent water and wear resistant properties. When surface temperatures of the board exiting the drying oven are experienced greater than about 165° F. (74° C.), the wax can be maintained at a temperature at or above its melt point of 155° F. (68° C.) and no additional heating may be necessary. However, it has been discovered that surface temperatures of drying gypsum board sometimes do not reach these temperatures because during the drying process the free water removed therefrom cools the board, and the core and surface areas never approach the internal temperature of the drying oven. Therefore, a second heating step for maintaining said wax at a temperature of no less than about 155° F. (68° C.) is necessary. As with a cast gypsum article, it is important that serious degradation of the set board not be experienced. Thus in one application, the method for producing a wear resistant and water repellent gypsum board includes the step of placing the board into heated oven means for no greater than about 60 seconds. This step may include preheating oven means to a temperature of from about 300° F. (149° C.) to about 650° F. (343° C.). At this relatively high temperature, minute flakes and lumps of the Candelilla wax are melted and seep into the surface irregularities and pores to provide the surface coating. An alternate step for maintaining wax in a molten condition includes placing the gypsum board into an oven means for no greater than about 15–20 minutes. In this alternative step it may additionally include heating the oven means to a temperature of from about 155° F. (68° C.) to about 220° F. (104° C.). This less hot oven temperature again avoids serious re-calcination of the gypsum while yet allowing the molten wax to properly coat the exterior face of the board.

Other related techniques for maintaining the wax in a molten state may include utilizing heat emitting means emitting heat at relatively high temperatures of greater than about 400° F. (204° C.). Such heat emitting means may include infrared lamps, hot air guns, open flames, and the like, as would be well understood by one skilled in the art. With utilization of such means, contact with individual portions, or areas, of the exterior face should be maintained for no greater than about a few seconds to intensely, but quickly, heat and keep the wax in a molten state for proper coating.

Subsequent to maintaining the wax in the molten state and allowing it to coat the surface, the gypsum board may be cooled to ambient room temperatures whereby in from about one to three days the Candelilla wax solidifies to a hard water resistant and wear resistant surface finish.

When surface coating gypsum board, the described method may include coating both opposite exterior faces when such would be needed for specific applications. Moreover, conventional gypsum board production also incorporates a paper coating of gypsum board. The application of Candelilla wax in a molten state to the paper is also envisioned within the scope of this invention and the method of applying the wax in the proportion of no less than about 0.020 pounds per square foot (0.010 grams per square centimeter) is fully useable therefor.

For both cast articles and wall board, the preferred technique for applying the molten wax is by brushing. However, suitable alternatives include, but are not limited to, roller coating and spraying.

With the foregoing methods for producing a wear resistant and water repellent plaster article, it is seen that such an article comprises a formed plaster article having an exterior surface portion thereof coated with a thin layer of Candelilla wax. The wax being solidified to a hard finish and present in an amount of no less than about 0.020 pounds per square foot (0.010 grams per square centimeter). The wax coating at said exterior portion substantially fills exterior pores and irregularities. The coated surface provides a substantially water impregnable barrier and enhanced wear resistance. Due to the nature of Candelilla wax, a light yellow to light brown coloration is obtained which is capable of being buffed to a lustrous finish upon hardening. The Candelilla wax has a sufficiently high melt point providing a firm surface upon exposure to ambient room temperatures of up to about 130° F. (54° C.).

Test procedures on plaster articles utilizing the foregoing application of Candelilla wax have been conducted. The unexpected results show significant increases in water resistance and wear resistance. The results indicate that Candelilla wax is superior to previous attempts, including introduction of water resistant compositions into the gypsum slurry. Additionally, with a surface treating, rather than an integral slurry mixture being utilized, significant material savings can be obtained in that the water and wear resistance is at the surface where it is critical without material being wasted at the interior of the core.

TEST NO. 1

In determining water resistancy, the absorption rate over a period of time has been considered and evaluated. Samples of plaster articles were formed and allowed to dry in a normal fashion wherein, subsequent to setting, the article was dried for 60 minutes at a temperature of 110° F. (43° C.). Typical water absorption rate testing procedures have more particular applicability to those water resistant procedures wherein the water resistant additive is combined within the plaster and water slurry prior to setting. With the water resistant additive provided and interlocking the crystalline structure of the set gypsum article, evaluation of the water absorbtion can be made. With the surface treatment disclosed herein, the exterior surfaces of the tested plaster articles were entirely coated by Candelilla wax. Conventional testing procedures involve drying the samples to a constant weight at 110° F. (43° C.) and then placing the sample in water at a temperature of from about 70° F. (21° C.) to 80° F. (27° C.). The samples, typically two inch cubes, are totally immersed in water and weighed at time intervals to indicate the amount of water absorption (expressed as a percentage of the total weight of the cube). Sample articles were manufactured in such a manner having three plaster-to-water ratios: 400 grams gypsum to 280 grams of water; 800 grams of gypsum to 320 grams of water; and, 800 grams of gypsum to 400 grams of water. They were all dried at 110° F. (38° C.) in a normal fashion. They were made with two cubes for each weight ratio. One of the two cubes for each group was treated with 0.020 pounds per square foot (0.010 grams per square centimeter) of Candelilla wax over its entire exterior surface. The second sample of each group was treated with Candelilla wax in an amount of 0.07 pounds per square foot (0.035 grams per square centimeter) of wax. The wax was brushed on and the molten state was maintained by placing the samples into an oven at a temperature of about 220° F. (104° C.) for about 20 minutes. Full immersion of the test cubes pursuant to the expressed conventional water absorption rate test resulted in excellent water resistant properties. It was determined that after one day of immersion, with intermittent weighings at 15 minutes, 1 hour and 24 hours, the amount of water absorbed was less than two percent. The samples having the higher amounts of Candelilla wax were slightly more water resistant. The samples were properly coated wherein substantially all exterior pores and irregularities were filled by the molten wax and the wax formed a hard finish. While criticism of surface coatings has been made in past attempts at water resistance, the main objection to surface coatings is that pinholes may be formed at the surface, thus allowing significant moisture into the article. When properly coated, however, the use of Candelilla wax in the foregoing method showed excellent results and any water absorbed which may have been attributable to pinholes, was very slight.

TEST NO. 2

Another test procedure was undertaken. This test involved forming slabs of a gypsum article in the same gypsum-to-water proportions as with the foregoing water immersion test samples. However, the slabs were provided in a ⅜"×3"×15" dimension and cut in half. They were dried in a normal fashion in a heated oven for about one hour at 220° F. (140° C.). Erosion tests were run on all of the samples. This erosion test involved dripping a stream of water at ambient room temperature, 70° F. (21° C.), at a rate of 17.5 gallons per hour for an eight hour period. The controlled stream of running water emanated from a nozzle placed at a height of about 36 inches (91 centimeters). Control samples, not having a surface coating, were also tested in the same manner. The control test samples were dried and weighed after eight hours. The amount of erosion was found to be at a rate of about 1.7 grams per hour for the control samples. The wax coated samples varied in erosion resistance at rates of from about 0.4 grams per hour to about 0.8 grams per hour. The surfaces treated with greater amounts of wax provided better wear resistance (0.4–0.5 grams per hour). Thus, as particular needs arise such as the use of a cast gypsum article with a Keller machine, increased resistance can be obtained as required. However, wear resistance, far exceeding untreated articles, can economically be obtained by utilizing only 0.020 pounds per square feet (0.010 grams per square centimeter) of surface coating.

TEST NO. 3

Impact resistance is related to wear resistance, and impact tests were run on samples coated identically as those in the foregoing test procedure for wear resistance. This test was conducted on uncoated control samples formed from a gypsum and water slurry in the proportions as used for the water immersion tests. The coated and uncoated samples for each proportion were provided in slabs of a ⅜"×3"×15" dimension. The test procedure was conducted by dropping a steel ball having a weight of 128 grams from successively increasing heights dropped on different areas of the slabs until fracture occurred. The impact strength is calculated by multiplying the weight of the steel ball by the height, in centimeters, of the drop at which fracture occured. The control samples were determined to have an impact strength of 1600 to 2000 gramcentimeters. The samples treated with Candelilla wax evidenced an impact resistance of 3,000 to 3,500 gram-centimeters. These excellent results indicate the significant impact resistance attained by this invention.

TEST NO. 4

A testing procedure was provided on similar test samples as described in Test No. 3 and was conducted to measure the hardness obtained by the utilization of the Candelilla wax surface coating. This test measured the hardness of the treated surface versus control samples (untreated). In this test an 8 mm diameter flat pin contacts the surface and is subjected to increasing loading. Samples are tested for a penetration of a predetermined amount, and the amount of force required to reach such penetration is measured. The control test samples had a hardness of 17–23 kg for a 0.0025 inch (0.006 centimeter) penetration, while the surfaces treated with the Candelilla wax broke before a penetration of 0.0025 inches (0.006 centimeters) could be obtained. It has been estimated that the loading necessary to obtain this penetration would be in excess of 28 kg.

In view of the foregoing testing procedures, it is seen that not only is water resistance provided, but wear resistance, and related impact strength and hardness, are greatly enhanced. In comparison with untreated samples the coated samples show the surprising benefits of this invention. With respect to prior art attempts at water resistancy, the additional benefits of wear resistance, hardness, and impact strength, are not obtained. When coated samples were subjected to water, it was noted that the coated surface forced the water to bead up without saturation visually apparent. Moreover, the utilization of Candelilla wax allows such plaster articles to be buffed to a lustrous finish, which is an additional benefit of the invention. The use of Candelilla wax permits a plaster article to be used wherein ambient room temperatures of up to about 130° F. (54° C.) are experienced, since the surface coating remains firm. However, the melt point is in a temperature range which may be maintained to allow the molten wax to seep into exterior surface irregularities and pores, without requiring such a high temperature that serious recalcination of gypsum would occur.

It is thus apparent that a method of surface treatment for plaster articles, whether cast or formed on a gypsum board-line, is provided which improves wear resistance and water repellency by the utilization of a surface coating of Candelilla wax. Such surface treated plaster articles overcome many of the problems with prior art techniques in obtaining water resistancy and additionally offers the benefits of increased wear resistance, superior impact strength and improved hardness, as well. Such is obtainable by the use of a relatively small amount of wax at the surface to be coated. While the preferred embodiments for this invention are expressed for explication of this invention, it is clear that the invention includes a broad scope and range beyond the embodiments specified, as would be well understood.

What is claimed is:

1. A wear resistant and water repellent plaster article comprising
   a formed plaster article having an exterior surface portion thereof coated with a thin layer of Candelilla wax,
   said wax solidified to a hard finish,
   said wax present in an amount no less than about 0.020 pounds per square foot (0.010 grams per square centimeter),
   said wax coating said exterior surface portion and substantially filling exterior pores and irregularities,
   said coated surface portion providing a substantially water impregnable barrier and providing enhanced wear resistance,
   said coated surface portion having a light yellow to light brown color and capable of being buffed to a lustrous finish,
wherein said wax has a sufficiently high melt point providing a firm surface upon exposure to ambient room temperatures of up to about 130° F. (54° C.).

2. A wear resistant and water repellent plaster article as claimed in claim 1 wherein said wax coating is provided for substantially the entire exterior surface of said plaster article.

3. A wear resistant and water repellent cast plaster article comprising
   a cast plaster article having substantially the entire exterior surface thereof coated with a thin layer of Candelilla wax,
   said wax solidified to a hard finish,
   said wax present in an amount no less than about 0.020 pounds per square foot (0.010 grams per square centimeter),
   said wax coating said exterior surface and substantially filling exterior pores and irregularities,
   said coated surface providing a substantially water impregnable barrier and providing enhanced wear resistance,
   said coated surface having a light yellow to light brown color and capable of being buffed to a lustrous finish,
wherein said wax has a sufficiently high melt point providing a firm surface upon exposure to ambient room temperatures of up to about 130° F. (54° C.).

4. A gypsum board having two opposite faces,
   at least one face having wear resistance and water repellency, said face coated with a thin layer of Candelilla wax,
   said wax solidified to a hard finish,
   said wax present in an amount no less than about 0.020 pounds per square foot (0.010 grams per square centimeter),
   said wax coating said face and substantially filling exterior pores and irregularities,
   said coated face providing a substantially water impregnable barrier and providing enhanced wear resistance,
   said coated face having a light yellow to light brown hue capable of being buffed to a lustrous finish,
wherein said wax has a sufficiently high melt point providing a surface upon exposure to ambient room temperatures of up to about 130° F. (54° C.).

5. A gypsum board having two opposite faces as in claim 4 wherein said gypsum board includes said wax coating at both opposite faces.

6. A gypsum board having two opposite faces as in claim 4 wherein said opposite faces include a paper coating.

* * * * *